United States Patent [19]

Libertini et al.

[11] 4,329,644
[45] May 11, 1982

[54] ELECTRODE STRUCTURE FOR A HIGH TEMPERATURE CAPACITANCE PROBE FOR SENSING TURBINE SPEED

[75] Inventors: Zoltan L. Libertini, Stamford; Alan R. Duly, Huntington; Steven D. White, North Haven, all of Conn.

[73] Assignee: Avco Corporation, Stratford, Conn.

[21] Appl. No.: 137,072

[22] Filed: Apr. 3, 1980

[51] Int. Cl.³ .................. G01P 3/483; G01R 27/26; G01R 1/06
[52] U.S. Cl. ............................ 324/160; 324/61 P; 324/166
[58] Field of Search ............ 324/61 R, 61 P, 160, 324/166, 71 R, 149, 72.5; 73/305 C, 462; 310/68 B, 68 E

[56] References Cited

U.S. PATENT DOCUMENTS

| | | | |
|---|---|---|---|
| 2,123,812 | 7/1938 | Stevens et al. | 324/61 P |
| 2,653,298 | 9/1953 | McKinley | 324/61 P |
| 2,842,738 | 7/1958 | Warnick | 324/61 R |
| 3,714,012 | 1/1973 | Herron | 324/71 R |
| 4,063,167 | 12/1977 | Duly | 324/61 R |

Primary Examiner—Gerard R. Strecker
Attorney, Agent, or Firm—Ralph D. Gelling

[57] ABSTRACT

A probe is constructed for placement in the hot turbine section of a gas turbine engine. A housing containing two electrodes extends through the turbine shroud into the tip clearance area of the turbine rotor. A voltage impressed across the electrodes will generate an electric field in the vicinity of the turbine blades which will be distorted as the blades pass, thereby generating a charge pulse at the output of the probe. The electrode conductors are imbedded in pins which are retained by insulating rings brazed in place. The electrodes extend slightly outward from the surrounding insulating surfaces to create an air gap around each electrode. This air gap provides additional insulation and prevents contamination.

1 Claim, 5 Drawing Figures

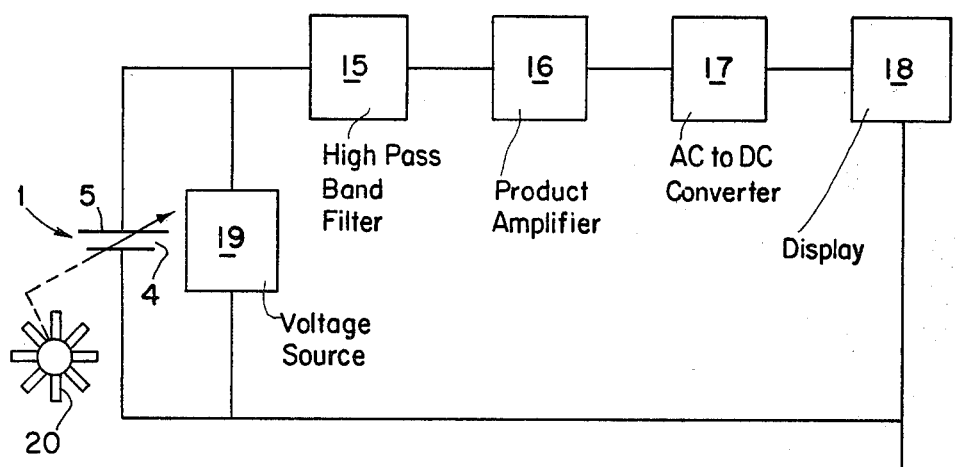
Fig.2.
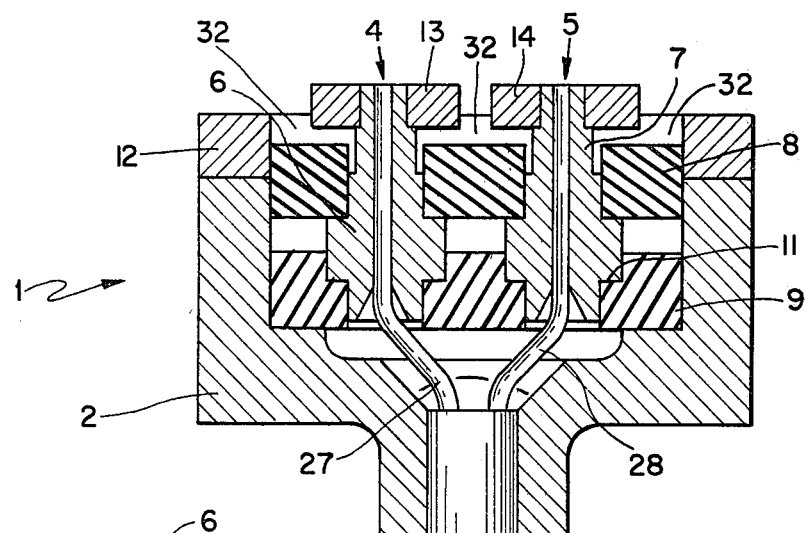
Fig.4.
Fig.5.

ELECTRODE STRUCTURE FOR A HIGH TEMPERATURE CAPACITANCE PROBE FOR SENSING TURBINE SPEED

BACKGROUND OF THE INVENTION

It is essential in a gas turbine engine to monitor the speed of the rotating parts. In the past, this has been accomplished through the use of magnetic or optical sensors that can detect shaft or rotor speed. Sensors of this type are sensitive to heat and contamination and therefore are restricted in use to the cooler, less dirty, portions of the engine, i.e. compressor, bearings, and forward shafting. The information provided by these systems is, therefore, limited and will not necessarily indicate rotor conditions in the turbine section. This becomes critical if there is a compressor turbine shaft failure forward of the speed sensor. The indicator of the prior art would show a slowing down of the compressor and call for an increase in fuel to compensate for the declining speed, when in actuality the compressor turbine, free of its load, is beginning to accelerate to rotational speeds which may cause it to break apart.

It is the purpose of this invention to provide a probe which can withstand the turbine nozzle environment, the temperatures of which may exceed 1600° F. and which is dense in the products of combustion. This probe can generate a signal which can be used for tip clearance control, speed monitoring, and other purposes depending on the electronic analysis of the signal. This particular application will describe a speed monitoring system.

PRIOR ART

A system for monitoring tip clearance is described in U.S. Pat. No. 4,063,167, which issued on Dec. 13, 1977 and is assigned to Avco Corporation, the assignee of the subject invention. This system utilizes a capacitance type probe placed in the tip clearance area of a compressor. An electronic circuit receives the signal from the probe and registers the change in capacitance caused by the compressor rotor blades as they pass the probe. This particular probe utilizes thermal setting epoxy to hold its electrodes in place and, because of this and other details of its construction, it will tend to break down as the temperature at the electrodes is increased. Since the purpose of the subject system is to detect turbine over speed, it must be extremely reliable at high temperatures.

SUMMARY OF THE INVENTION

The high temperature probe of this invention consists of a housing having an inner cavity adapted to receive an electrode assembly. The electrode assembly involves inner and outer insulating retaining rings which are sequentially placed over a pair of electrode pins within the housing. The retaining rings position the electrodes within the housing and are held in place by a cap. Tip elements are placed over the electrode holders at their outer extremity. The entire assembly is secured in place by vacuum brazing. The signal from the probe is transmitted over a shielded cable to a signal processing circuit which converts it to a direct speed signal capable of driving a meter or other visual display.

DESCRIPTION OF THE DRAWING

The details of the invention are further described below with reference to the drawing in which:

FIG. 2 is a block circuit diagram for a speed sensing system employing the subject invention;

FIG. 4 is a cross-sectional view of the probe of this invention; and

FIG. 5 is a cross-sectional view of the electrode pin of the probe of this invention.

DESCRIPTION OF THE PREFERRED EMBODIMENT

Figure 1:
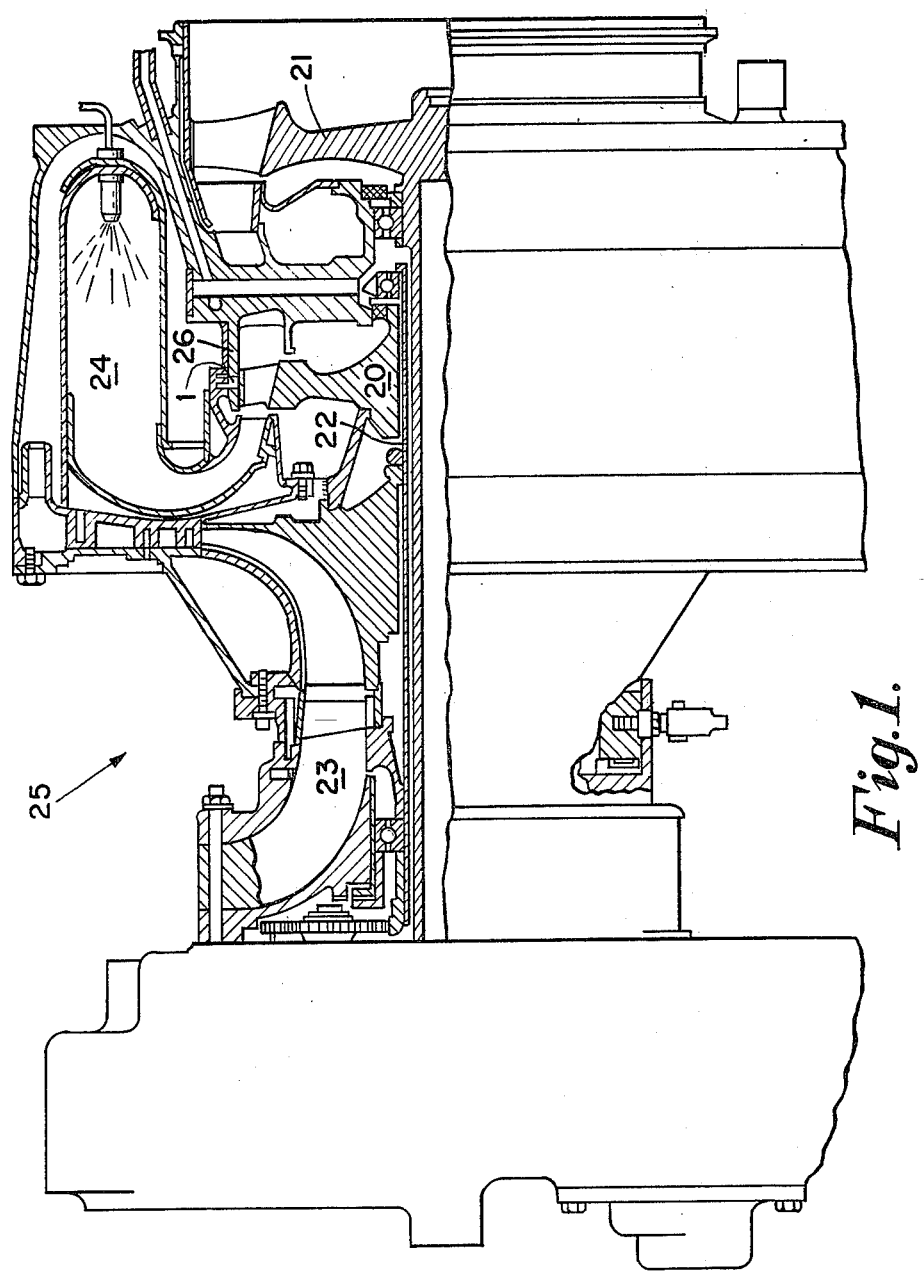
FIG. 1 is a partial cross-sectional view of a typical gas turbine engine.

The speed sensing system of this invention is used in gas turbine engine 25 as shown in FIG. 1. Engine 25 consists of a compressor 23, combustor 24, compressor turbine 20 and power turbine 21. Compressor turbine 20 drives compressor rotor 23 through shaft 22. High temperature probe 1 is inserted in the shroud 26 of compressor turbine 20.

Prior art speed sensors are limited to use in the region of compressor 23, either in association with the rotor or on shaft 22. It can be observed that a failure of shaft 22 in the hot section of engine 25 will not immediately be reflected by sensors located in the cooler sections.

Probe 1 as shown in the block diagram of FIG. 2 is connected to a source of voltage 19, which can be 500 volts across the electrodes 4 and 5 of probe 1. The output of probe 1 is connected to high pass band filter 15 which is necessary because of the environment in the turbine section which includes high temperature gases and combustion products.

Product amplifier 16 receives the filtered signal which is then converted from an AC charge to an AC voltage and amplified. After processing by frequency to DC converter 17, the signal is read by metered display 18. Alternately, the signal can be read by a frequency counter or used in an overspeed protection device to shut off fuel to the engine when the turbine speed reaches a predetermined threshold.

Figure 3:
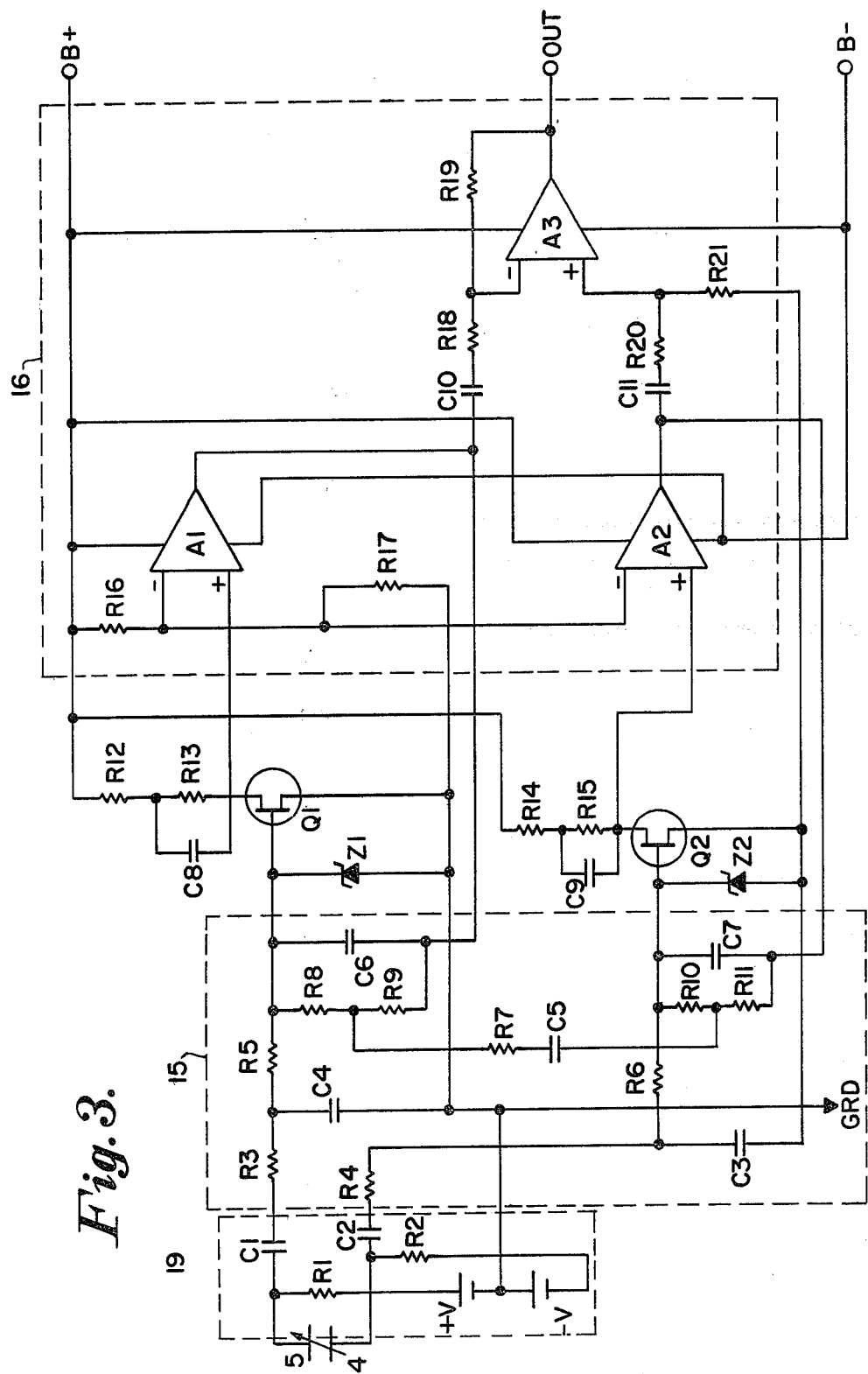
FIG. 3 is a circuit diagram for the filtering and amplifier portions of the block diagram of FIG. 2.

FIG. 3 shows more detail of the circuit items shown as 15, 16, and 19 on FIG. 2. Items 17 and 18 are not described since any suitable commercially available units may be used. DC excitation voltage is supplied to the probe poles 4 and 5 by +V and −V through current limiting resistors R1 and R2. C1 and C2 are decoupling capacitors which prevent the excitation voltage being applied to the input of Q1 and Q2.

The high pass filters are 3 pole differential type and are made up from the combinations of R3, R5, C4; R8, R9, C6; and C10 R18; and R19 for one half of the differential stage and corresponding components R4, R6, C3; R10, R11, C7; and C11, R20, and R21 on the other half.

The differential gain (amplification) of the system is provided by operational amplifiers A1, A2, and A3 in combination of feedback paths provided by R8, R9, for A1, R10, R11, for A2 and R19 and R21 for A3.

Noise suppression and over-voltage protection is supplied by the zener diodes Z1 and Z2 which limit the voltage of Q1 and Q2 to safe operating levels.

The field effect transistors Q1 and Q2 in the input paths to amplifiers A1 and A2 provide a very high input impedance to the circuit allowing the system to act as a charge amplifier in order to convert the di-electric changes across the probe poles 4 and 5 to proportional voltages at the output of A3.

The structure of probe 1 is shown in detail in FIG. 4 of the drawing. All of the materials must be chosen for their high temperature properties and the assembly is designed to minimize contamination by combustion by-products. Although other materials may be used, it was found that KOVAR is suitable for the structural elements and synthetic sapphire is used for the insulating members.

Housing 2 is formed with a centrally located cup-shaped receptacle which receives the electrode assembly. Housing 2 is also constructed with an opening through which passes the cable 3. Cable 3 has two nickel-nickel conductors 27 and 28 protected by a sheath constructed of INCONEL or HASTELLOY X. Conductors 27 and 28 are connected to electrode pins 6 and 7 through channel 31 as shown in FIG. 5.

Pins 6 and 7 are identical and are constructed with a conductor channel 31 and positioning shoulder 30. A key projection 29 extends outward from the body to engage the slot of insulating retaining ring 9. Insulating ring 9, constructed of synthetic sapphire, is placed within the receptacle of housing 2 to provide an insulating barrier to the inner portion of electrode pins 6 and 7. Insulating ring 9 is slotted at 11 to accept the key projections 29 to prevent rotation of pins 6 and 7. An outer retaining ring 8 constructed of synthetic sapphire material fits over pins 6 and 7. Electrode tips 13 and 14 are placed over the pins 6 and 7 and rest on shoulder 30. Shoulder 30 is constructed to maintain the electrode tip slightly raised from the surface of ring 8 to provide an insulating air gap beneath the electrode tips 13 and 14. Electrode tips 13 and 14 are sized to insure an air gap surrounding each electrode. A cap 12 is placed over housing 2 to complete the assembly and secure retaining ring 8. The entire assembly may then be secured by high temperature brazing under vacuum at a temperature ranging from 1700° F. to 2100° F. depending on the materials used.

In this manner electrode assemblies 4 and 5 are constructed and positioned within housing 2 with an insulating air gap 32 separating the electrodes 4 and 5 from each other, from housing 2 and from insulating ring 8. As shown in FIG. 4, electrode pins 6 and 7, together with the electrode tips 13 and 14, form electrodes having a substantially T-shaped cross section extending outward from the receptacle of housing 2. The electrode assembly, in particular, the T-shaped extremity, is entirely surrounded by air gap 32 both on the sides and underneath. This elongates the shorting path upon which contaminates can accumulate and also hinders such accumulation. It has been found that this particular construction of air gap 32 causes a marked increase in high temperature performance. Breakdown had occurred in the prior art at between 800° F. and 1000° F. in the best circumstances. With the probe of this invention, temperatures of over 2000° F. may be reached without effecting reliability. In addition, accurate positioning is achieved to facilitate calibration.

Housing 2 and electrode assemblies 4 and 5 which include pins 6 and 7 and tips 13 and 14 are made of a material such as KOVAR with a temperature resistance of 2000° F. Insulating elements 8 and 9 are constructed of synthetic sapphire having a maximum temperature capability of over 3000° F.

The entire assembly may be inserted in an aperture in the turbine shroud and bolted and sealed in place.

In operation, a 500 volt voltage is impressed across electrodes 4 and 5 thereby creating an electric field in the vicinity of the probe 1. The intensity of this field is proportional to the voltage and the capacitance between the electrodes. The capacitance between the electrodes will be small while the probe is surrounded by gases, but as a blade passes the probe, the capacitance increases because of the higher dielectric constant of the blade material. With the capacitance increase there will be a corresponding voltage pulse generated in the output of probe 1. A pulse will, therefore, occur for each blade as it passes the probe, thereby providing an accurate speed related signal for the speed monitoring circuit. Since the magnitude of the pulse is inversely proportional to the clearance between the blade tip and the probe electrodes 4 and 5, a reading indicative of tip clearance can also be obtained.

With reference to the description above and the drawing herein we claim the following invention.

What is claimed is:

1. A probe for sensing the passing of a rotor blade in the hot turbine section of a gas turbine engine comprising:

a housing constructed of high temperature resistant material having an open receptacle constructed therein;

an insulating member constructed of high temperature resistant insulating material secured in the receptacle of the housing and adapted to receive and position at least one pair of electrodes within the housing, said insulating member constructed to insulate the electrodes from the housing;

at least one pair of electrodes constructed of high temperature resistant material mounted in locked position within the insulating member and further comprising:

an electrode pin constructed to fit into the insulating member and being positioned thereby to extend outward from the housing;

an electrode tip secured to the outer extremity of the electrode pin and extending transverse thereto to form an electrode having a substantially T-shaped cross section, said electrode tip being entirely surrounded by an air gap thereby increasing the over surface path between the electrodes and between the electrodes and the housing;

a cable extending through the housing and containing a conductor connected to each electrode; and means to mount the probe in proximity to the turbine blades of the gas turbine engine in a position at which the electrodes extend into the turbine area sufficiently close to the turbine blades such that an electrical field applied to the electrodes will be altered by the passage of the turbine blades.

* * * * *